United States Patent
Gillett et al.

(10) Patent No.: US 10,101,749 B1
(45) Date of Patent: Oct. 16, 2018

(54) COMBINED AIRSPEED AND INERTIAL DATA FOR ROTORCRAFT LONGITUDINAL CONTROL

(71) Applicant: Bell Helicopter Textron Inc., Fort Worth, TX (US)

(72) Inventors: Luke Dafydd Gillett, Grapevine, TX (US); Robert Earl Worsham, II, Weatherford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/465,417

(22) Filed: Mar. 21, 2017

(51) Int. Cl.
| | |
|---|---|
| *G01P 5/00* | (2006.01) |
| *B64C 27/26* | (2006.01) |
| *G01P 5/16* | (2006.01) |
| *G05D 1/10* | (2006.01) |
| *B64C 27/06* | (2006.01) |
| *B64C 27/82* | (2006.01) |
| *B64D 43/02* | (2006.01) |
| *B64C 17/06* | (2006.01) |
| *G01C 21/18* | (2006.01) |
| *B64C 13/50* | (2006.01) |

(52) U.S. Cl.
CPC .......... *G05D 1/101* (2013.01); *B64C 13/503* (2013.01); *B64C 17/06* (2013.01); *B64C 27/06* (2013.01); *B64C 27/82* (2013.01); *B64D 43/02* (2013.01); *G01C 21/18* (2013.01)

(58) Field of Classification Search
CPC ........ G05D 1/01; G05D 1/063; G05D 1/0638; G05D 1/0676; G05D 1/101; G01P 5/00; G01P 5/16; B64C 27/26
See application file for complete search history.

(56) References Cited

U.S. PATENT DOCUMENTS

| | | | |
|---|---|---|---|
| 3,814,912 A | 6/1974 | Manke et al. | |
| 3,989,208 A * | 11/1976 | Lambregts | G05D 1/063 244/182 |
| 4,382,283 A * | 5/1983 | Clelford | G01P 5/16 244/17.13 |

(Continued)

FOREIGN PATENT DOCUMENTS

| | | |
|---|---|---|
| EP | 0482250 | 4/1992 |
| ES | 2400152 A2 | 4/2013 |

*Primary Examiner* — Yuri Kan
(74) *Attorney, Agent, or Firm* — Slater Matsil, LLP (57) ABSTRACT

A rotorcraft includes airspeed sensors, inertial sensors, and a flight control computer (FCC) operable to provide a longitudinal control for the rotorcraft. The FCC receives a first indication of longitudinal airspeed from the airspeed sensors and receives a first indication of longitudinal acceleration from the inertial sensors. The FCC generates a filtered indication of longitudinal airspeed from the first indication of longitudinal airspeed and generates a scaled and filtered indication of longitudinal acceleration from the first indication of longitudinal acceleration. The FCC combines the filtered indication of longitudinal airspeed with the scaled and filtered indication of longitudinal acceleration to generate a determined longitudinal airspeed. The FCC generates a flight control signal to control operation of the rotorcraft, the flight control signal based on the determined longitudinal airspeed.

20 Claims, 4 Drawing Sheets

(56) References Cited

U.S. PATENT DOCUMENTS

| | | | |
|---|---|---|---|
| 4,536,843 A * | 8/1985 | Lambregts | G05D 1/0638 244/181 |
| 4,740,899 A | 4/1988 | McElreath | |
| 4,801,110 A * | 1/1989 | Skutecki | G05D 1/0676 244/17.13 |
| 5,422,517 A | 6/1995 | Verney et al. | |
| 5,844,329 A | 12/1998 | Bailey et al. | |
| 6,664,656 B2 | 12/2003 | Bernier | |
| 7,482,709 B2 | 1/2009 | Berenger | |
| 7,747,879 B2 | 6/2010 | Tofigh et al. | |
| 7,872,368 B2 | 1/2011 | Karimi et al. | |
| 9,172,272 B2 | 10/2015 | Malo | |
| 9,327,600 B1 | 5/2016 | Nehmeh | |
| 2006/0253230 A1 | 11/2006 | Fanciullo et al. | |
| 2008/0237392 A1 * | 10/2008 | Piasecki | B64C 27/26 244/6 |
| 2011/0175450 A1 | 7/2011 | Vicari et al. | |
| 2013/0325220 A1 * | 12/2013 | Gardes | G01P 5/00 701/14 |
| 2015/0076900 A1 | 3/2015 | Johannsen | |
| 2016/0122033 A1 | 5/2016 | Liffring et al. | |

\* cited by examiner

COMBINED AIRSPEED AND INERTIAL DATA FOR ROTORCRAFT LONGITUDINAL CONTROL

TECHNICAL FIELD

The present invention relates generally to a system and method for automated flight control in a rotorcraft, and, in particular embodiments, to a system and method for determining a longitudinal airspeed of a rotorcraft.

BACKGROUND

A rotorcraft may include one or more rotor systems including one or more main rotor system. A main rotor system may generate aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor, and a control system may assist the pilot in stabilizing the rotorcraft and reducing pilot workload.

SUMMARY

According to an embodiment, a rotorcraft includes multiple airspeed sensors multiple inertial sensors, and a flight control computer (FCC) operable to provide a longitudinal control for the rotorcraft. The FCC is configured to receive a first indication of longitudinal airspeed from the multiple airspeed sensors and to receive a first indication of longitudinal acceleration from the multiple inertial sensors. The FCC is also configured to generate a filtered indication of longitudinal airspeed from the first indication of longitudinal airspeed and to generate a scaled and filtered indication of longitudinal acceleration from the first indication of longitudinal acceleration. The FCC is also configured to combine the filtered indication of longitudinal airspeed with the scaled and filtered indication of longitudinal acceleration to generate a determined longitudinal airspeed and generate a flight control signal to control operation of the rotorcraft, the flight control signal based on the determined longitudinal airspeed.

According to another embodiment, a flight control system computer (FCC) for a rotorcraft, includes a processor and a non-transitory computer-readable storage medium storing a program to be executed by the processor, the program including instructions for providing control of the rotorcraft. The instructions for providing control of the rotorcraft include instructions for receiving measured longitudinal airspeed data from an airspeed sensor, processing the measured longitudinal airspeed data using a first low-pass filter, receiving measured acceleration data from an acceleration sensor, processing the measured acceleration data using a second low-pass filter having a selectable gain, adding the processed acceleration data to the processed longitudinal airspeed data to reduce a phase lag of the processed longitudinal airspeed data, and controlling one or more flight control elements of the rotorcraft based on the processed longitudinal airspeed data.

According to another embodiment, a method includes receiving airspeed data from an airspeed sensor of a rotorcraft and receiving acceleration data from an inertial sensor of the rotorcraft. The method also includes filtering the airspeed data to generate filtered airspeed data, filtering the acceleration data to generate filtered acceleration data, and scaling the filtered acceleration data by a gain constant, the gain constant based on the filtering of the acceleration data. The method also includes summing the filtered airspeed data with the scaled and filtered acceleration data to generate an indication of longitudinal velocity of the rotorcraft, and receiving, by a flight control computer (FCC) of the rotorcraft, the indication of longitudinal velocity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like. The FBW systems in a rotorcraft may provide stability assistance or enhancement by analyzing or processing data received from sensors on the rotorcraft that provide data about the state of the rotorcraft or its environment.

Embodiments of the system presented herein are directed to providing a system and method for combining airspeed data and inertial data for the longitudinal control of a rotorcraft. The measured longitudinal airspeed of the rotorcraft is filtered and lag-compensated to reduce the effects of high-frequency perturbations such as signal noise, turbulence, wind gusts, etc. In this manner, operations within the FCCs that use measured longitudinal airspeed may be less likely to react to small or brief changes in longitudinal airspeed. This can enable a smoother or more stable flight, and thus improve ride quality, by reducing corrections to flight controls by the FCCs due to airspeed perturbations.

In some cases, filtering data can introduce a time lag due to the phase response of the filter, which can create undesirable effects such as an inaccurately determined rotorcraft state, rotorcraft instability, oscillations, or other effects. To reduce or eliminate lag, the filtered measurements from longitudinal airspeed sensors are combined with filtered longitudinal acceleration measurements from inertial sensors. In this manner, undesirable effects due to phase lag can be reduced or eliminated.

Figure 1:
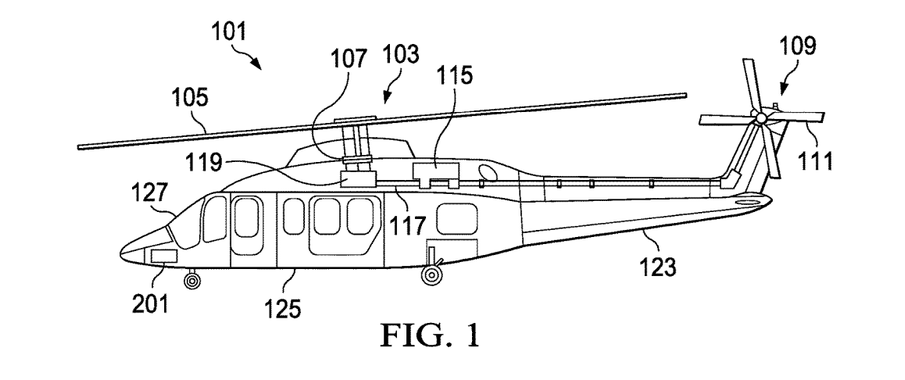
FIG. 1 illustrates a rotorcraft according to some embodiments.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
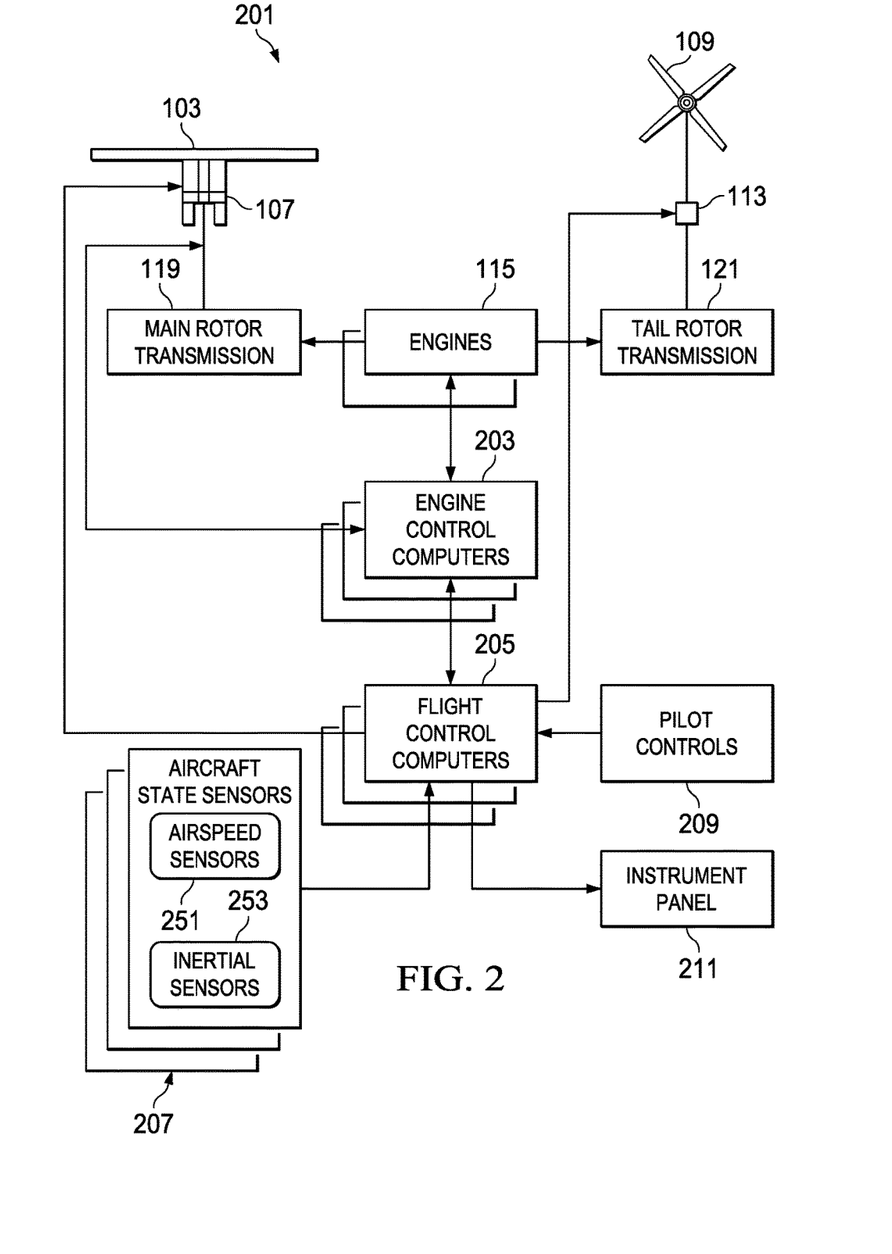
FIG. 2 illustrates a fly-by-wire flight control system for a rotorcraft according to some embodiments.

FIG. 2 illustrates a fly-by-wire (FBW) flight control system 201 for a rotorcraft according to some embodiments. A pilot may manipulate one or more pilot flight controls 209 in order to control flight of the rotorcraft. The pilot flight controls 209 may include manual controls such as a cyclic stick in a cyclic control assembly, a collective stick in a collective control assembly, and pedals in a pedal assembly. Inputs provided by the pilot to the pilot flight controls 209 may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and rotorcraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls 209 and data received from rotorcraft sensors 207. The FCCs 205 may use a set of control laws to analyze the inputs from the pilot controls 209, analyze data from the rotorcraft state sensors 207, and generate commands for the ECCs 203, engines 115, actuators, and other associated systems. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The rotorcraft sensors 207 are in communication with the FCCs 205. The rotorcraft sensors 207 may include sensors for measuring a variety of rotorcraft systems, flight parameters, environmental conditions and the like. For example, the rotorcraft sensors 207 may include sensors for measuring airspeed, altitude, attitude, position, orientation, temperature, airspeed, vertical speed, and the like. The rotorcraft state sensors 207 may, for example, include one or more airspeed sensors 251 for measuring longitudinal airspeed, such as a pitot probe, and inertial sensors 253 for measuring acceleration, such as gyroscopic sensors or accelerometers. Other sensors 207 could include sensors relying upon data or signals originating external to the rotorcraft, such as a global positioning system (GPS) sensor, a VHF Omnidirectional Range sensor, Instrument Landing System (ILS), and the like. In some cases multiple redundant rotorcraft sensors of the same type are used, and redundancy logic within the FCCs 205 selects or otherwise determines as single indication from the multiple redundant sensors.

Figure 3:
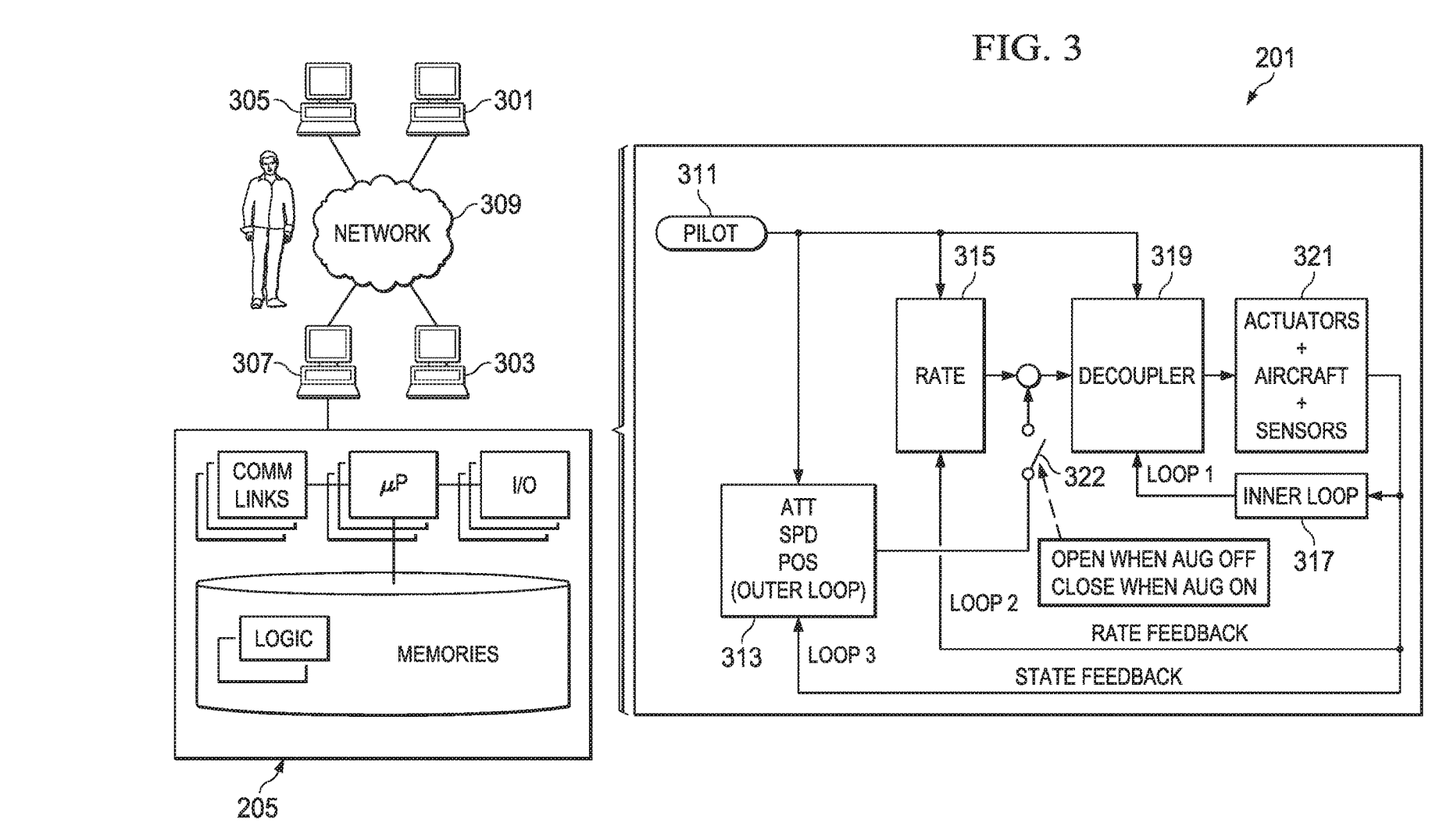
FIG. 3 representatively illustrates a three-loop flight control system according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as rotorcraft sensors 207 and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In some cases, one or more of these loops may use a filtered longitudinal speed determined from one or more rotorcraft sensors 207. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
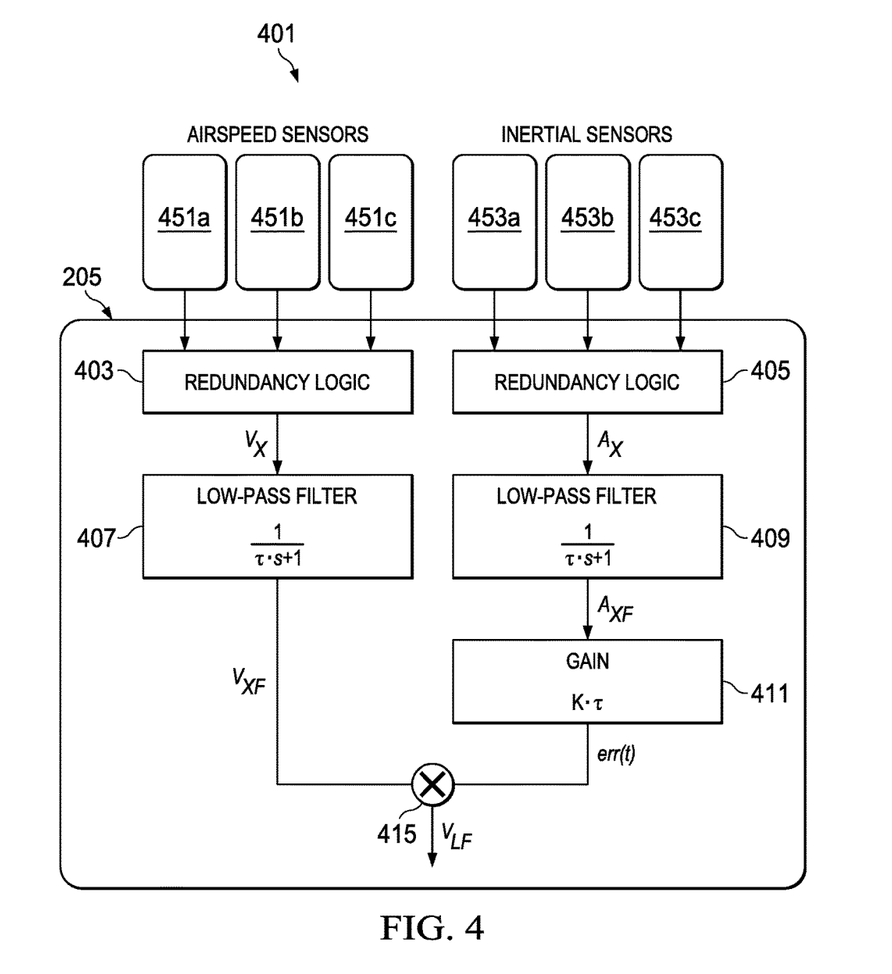
FIG. 4 is a flow diagram illustrating a method of determining a longitudinal airspeed according to some embodiments.

FIG. 4 is a flow diagram illustrating a method 401 of generating a filtered and lag-compensated longitudinal airspeed $V_{LF}$ of a rotorcraft according to some embodiments. Some or all of method 401 may be implemented by the FCCs 205 of a rotorcraft 101. The method 401 uses longitudinal airspeed data from multiple redundant airspeed sensors 451a-c and longitudinal acceleration data from multiple redundant inertial sensors 453a-c. The airspeed sensors 451a-c and inertial sensors 453a-c may, for example, be part of the rotorcraft sensors 207 on example rotorcraft 101. Three redundant airspeed sensors 451a-c and three redundant inertial sensors 453a-c are shown in FIG. 4, though in other embodiments more or fewer redundant sensors may be used for each type of sensor, or only a single sensor may be used.

Initially, redundancy logic 403 receives measured longitudinal airspeed data from each of airspeed sensors 451a-c. The redundancy logic 403, for example, may determine that one or more of airspeed sensors 451a-c have failed, or may reject data from an airspeed sensor 451a-c that does not match data from other airspeed sensors 451a-c within a threshold. The redundancy logic 403 may include other operations. The redundancy logic 403 may be part of the FCCs 205 as shown in FIG. 4, or may be part of another computing system on the rotorcraft configured to receive data from the airspeed sensors 451a-c. Based on the measured values from each airspeed sensor 451a-c, the redundancy logic 403 determines the longitudinal airspeed $V_X$ to be used subsequently in method 401, though the longitudinal airspeed $V_X$ may be also used in other systems or methods of the rotorcraft not described herein. The redundancy logic 403 may determine the longitudinal airspeed, for example, by selecting the median value of longitudinal airspeed from those measured by the airspeed sensors 451a-c, by determining an average value of longitudinal airspeed from those measured, or by another technique.

Similarly, redundancy logic 405 receives measured longitudinal acceleration data from the redundant inertial sensors 453a-c. The redundancy logic 405 determines the longitudinal acceleration $A_X$ to be used in subsequent processing within method 401, though the longitudinal acceleration $A_X$ may be also used in other systems or methods of the rotorcraft not described herein. The redundancy logic 405 may be similar to the redundancy logic 403, though in some embodiments, the redundancy logic 405 may be part of the same or part of a different system within the FCCs 205. In some embodiments, the redundancy logic 405 may use a similar or a different determination technique than the redundancy logic 403.

The longitudinal airspeed data $V_X$ determined by the redundancy logic 403 is sent to a low-pass filter 407 to generate filtered longitudinal airspeed $V_{XF}$. The low-pass filter 407 can reduce some higher-frequency signals that may be present within the longitudinal airspeed data $V_X$, such as those due to measurement noise, perturbations due to wind gusts, etc. The low-pass filter 407 may be a first-order filter or another type of filter. As shown in FIG. 4, the example low-pass filter 407 is a first-order filter with an s-domain transfer function of $$\frac{1}{\tau \cdot s + 1} \tag{1}$$

where $\tau$ is time constant of the filter. The low-pass filter 407 may be implemented, for example, as a digital filter algorithm or other logic within the FCCs 205. In some cases, the low-pass filter 407 may be implemented within control laws within the flight control system 201. In some cases, the filtered airspeed $V_{XF}$ is also multiplied by a gain.

The phase delay of the example low-pass filter 407 results in the filtered airspeed $V_{XF}$ lagging in time behind the measured airspeed $V_X$. In general, the filtered airspeed $V_{XF}$ at a time t will be reduced from the measured airspeed $V_X$ at time T by a lag error factor err(t):

$$V_X(t) - V_{XF}(t) = \text{err}(t). \tag{2}$$

The longitudinal acceleration data $A_X$ determined by the redundancy logic 405 is sent to low-pass filter 409 and gain 411 to generate filtered longitudinal acceleration $V_{AXF}$. The low-pass filter 409 can reduce some higher-frequency signals that may be present within the longitudinal acceleration data $A_X$. The low-pass filter 407 may be a first-order filter or another type of filter. As shown in FIG. 3, the example low-pass filter 409, like low-pass filter 407, is a first-order filter with an s-domain transfer function of $$\frac{1}{\tau \cdot s + 1} \tag{3}$$

where $\tau$ is time constant of the filter, and is the same as the $\tau$ of low-pass filter 407 shown in Equation (i). In this manner, the time lag of the filtered acceleration $A_{XF}$ is the same as the time lag of the filtered airspeed $V_{XF}$. The low-pass filter 409 may be implemented, for example, as a digital filter algorithm or other logic within the FCCs 205. In some cases, the low-pass filter 409 may be implemented within control laws within the flight control system 201.

In method 401, the low-pass filter 407 and the low-pass filter 409 both have the same time constant $\tau$. This time constant $\tau$ may be configured for different values depending on the specific application or characteristics of the system. In some cases, the time constant $\tau$ may be set to a value that is determined to sufficiently reduce noise while minimizing steady-state errors. In some embodiments, the time constant $\tau$ may be set to a value between about 1.5 seconds and about 10 seconds, such as about 3 seconds, though other values may also be used.

Due to the fact that acceleration is the time-derivative of velocity, the filtered acceleration $A_{XF}$ has a form approximately proportional to the lag error factor err(t) shown in Equation (2):

$$A_{XF}(t) \approx \frac{1}{K \cdot \tau} \cdot \text{err}(t) \tag{4}$$

where $\tau$ is the time constant of filters 407 and 409, and K is a constant. In method 401, the filtered velocity $A_{XF}$ is multiplied by (Kr) at gain 411 to produce the error factor err'(t):

$$A_{XF} \cdot (K \cdot \tau) \approx (K \cdot \tau) \cdot \frac{1}{K \cdot \tau} \cdot \text{err}(t) = \text{err}'(t). \tag{5}$$

In some cases, the error factor err'(t) of Equation (5) can be equal to or approximately equal to the lag error factor err(t) of Equation (2). In some cases, the most appropriate value of the gain constant K for err'(t) to accurately approximate the error factor lag err(t) is determined by parameters of the system, and K may be set to this most appropriate value or another value depending on the application. For example, K may be adjusted to compensate for computational effects or additional delays from method 401 or external to method 401, including the airspeed sensors 451a-c, the inertial sensors 453a-c, redundancy logics 403 or 405, the implementation of the filters 407 or 409, other algorithms within the FCCs 205, etc. In some embodiments, the gain constant K may be a value between about 0.5 and 2.0, such as about 1.667.

In some embodiments, the low-pass filter 409 and the gain 411 may be combined into a single transfer function with an s-domain transfer function of $$\left(\frac{1}{\tau \cdot s + 1}\right) \cdot (K \cdot \tau) = \frac{K \cdot \tau}{\tau \cdot s + 1}. \tag{6}$$

By combining the low-pass filter 409 and the gain 411 into a single transfer function (6), both low-pass filtering and gain multiplication may be carried out using a single algorithm rather than with two separate algorithms. This may result in less computational steps and thus improve response time to measured changes in airspeed.

At the summation junction 415, the error factor err'(t) determined from the inertial sensors 453a-c is added to the filtered airspeed $V_{XF}$ from the airspeed sensors 451a-c to generate filtered longitudinal airspeed $V_{LF}$:

$$V_{LF}(t)=V_{XF}(t)+\text{err}'(t). \tag{7}$$

By adding the error factor err'(t) to the filtered airspeed $V_{XF}$, the phase lag of the filtered airspeed $V_{XF}$ is reduced or eliminated. In this manner, an accurate longitudinal airspeed $V_{LF}$ is generated that has reduced noise with reduced phase lag effects. This longitudinal airspeed $V_{LF}$ generated by method 401 can be received by the FCCs 205, and can allow the FCCs 205 to provide improved longitudinal control of the rotorcraft.

Figure 5:
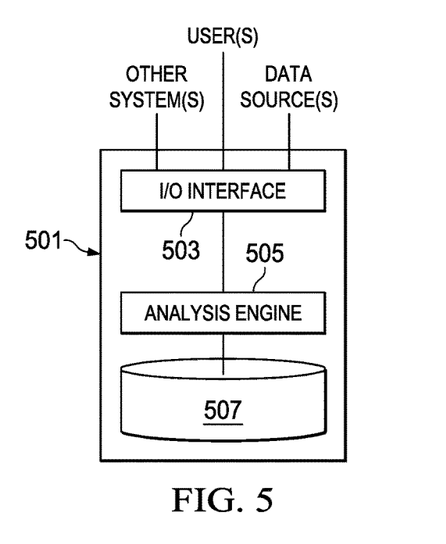
FIG. 5 illustrates a computer system according to some embodiments.

FIG. 5 illustrates a computer system 501 according to some embodiments. The computer system 501 can be configured for performing one or more functions with regard to the operation of the flight control system 201, the FCCs 205, or the method 401, as described herein. Further, any processing and analysis can be partly or fully performed by the computer system 501. The computer system 501 can be partly or fully integrated with other rotorcraft computer systems. In some embodiments, the computer system 501 is an FCC, and performs processing in parallel with other, redundant FCCs.

The computer system 501 can include an input/output (I/O) interface 503, an analysis engine 505, and a database 507. Alternative embodiments can combine or distribute the I/O interface 503, the analysis engine 505, and the database 507, as desired. Embodiments of the computer system 501 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 503 can provide a communication link between external users, systems, and data sources and components of the computer system 501. The I/O interface 503 can be configured for allowing one or more users to input information to the computer system 501 via any known input device. Examples can include a keyboard, mouse, touch screen, and/or any other desired input device. The I/O interface 503 can be configured for allowing one or more users to receive information output from the computer system 501 via any known output device. Examples can include a display monitor, a printer, cockpit display, and/or any other desired output device. The I/O interface 503 can be configured for allowing other systems to communicate with the computer system 501. For example, the I/O interface 503 can allow one or more remote computer(s) to access information, input information, and/or remotely instruct the computer system 501 to perform one or more of the tasks described herein. The I/O interface 503 can be configured to interact with one or more rotorcraft sensors such as those described herein. The I/O interface 503 can be configured for allowing communication with one or more remote data sources. For example, the I/O interface 503 can allow one or more remote data source(s) to access information, input information, and/or remotely instruct the computer system 501 to perform one or more of the tasks described herein.

The database 507 provides persistent data storage for the computer system 501. Although the term "database" is primarily used, a memory or other suitable data storage arrangement may provide the functionality of the database 507. In alternative embodiments, the database 507 can be integral to or separate from the computer system 501 and can operate on one or more computers. The database 507 preferably provides non-volatile data storage for any information suitable to support the operation of the FCCs 205 and the method 401, including various types of data discussed further herein. The analysis engine 505 can include various combinations of one or more processors, memories, and software components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
   a plurality of airspeed sensors;
   a plurality of inertial sensors;
   a flight control computer (FCC) operable to provide a longitudinal control for the rotorcraft, wherein the FCC is configured to:
   receive a first indication of longitudinal airspeed from the plurality of airspeed sensors;
   receive a first indication of longitudinal acceleration from the plurality of inertial sensors;
   generate a filtered indication of longitudinal airspeed from the first indication of longitudinal airspeed;
   generate a filtered indication of longitudinal acceleration from the first indication of longitudinal acceleration;
   multiply the filtered indication of longitudinal acceleration by a gain constant to generate a second indication of longitudinal acceleration;
   combine the filtered indication of longitudinal airspeed with the second indication of longitudinal acceleration to generate a determined longitudinal airspeed; and
   generate a flight control signal to control operation of the rotorcraft, the flight control signal based on the determined longitudinal airspeed.

2. The rotorcraft of claim 1, wherein the plurality of airspeed sensors comprise a plurality of pitot tubes.

3. The rotorcraft of claim 1, wherein the plurality of inertial sensors comprise a plurality of gyroscopic sensors.

4. The rotorcraft of claim 1, wherein the FCC is configured to receive the median indication of longitudinal airspeed of a plurality of indications of longitudinal airspeed from the plurality of airspeed sensors.

5. The rotorcraft of claim 1, wherein the FCC is configured to receive the median indication of longitudinal acceleration of a plurality of indications of longitudinal acceleration from the plurality of inertial sensors.

6. The rotorcraft of claim 1, wherein the filtered indication of longitudinal airspeed is generated from a low-pass filtering of the first indication of longitudinal airspeed.

7. The rotorcraft of claim 1, wherein the filtered indication of longitudinal acceleration is generated from a low-pass filtering of the first indication of longitudinal acceleration and the gain constant is based on a time constant of the low-pass filtering.

8. The rotorcraft of claim 1, wherein the determined longitudinal airspeed has less time lag than the filtered indication of longitudinal airspeed.

9. A flight control system computer (FCC) for a rotorcraft, comprising:
a processor; and
a non-transitory computer-readable storage medium storing a program to be executed by the processor, the program including instructions for providing control of the rotorcraft, the instructions for providing control of the rotorcraft including instructions for:
receiving measured longitudinal airspeed data from an airspeed sensor;
processing the measured longitudinal airspeed data using a first low-pass filter;
receiving measured acceleration data from an acceleration sensor;
processing the measured acceleration data using a second low-pass filter having a selectable gain;
adding the processed acceleration data to the processed longitudinal airspeed data to reduce a phase lag of the processed longitudinal airspeed data; and
controlling one or more flight control elements of the rotorcraft based on the processed longitudinal airspeed data.

10. The system of claim 9, wherein the selectable gain comprises a gain of about 0.5 to about 2.0 multiplied by a time constant of the second low-pass filter.

11. The system of claim 9, wherein the first low-pass filter and the second low-pass filter are first-order filters.

12. The system of claim 9, wherein the first low-pass filter and the second low-pass filter have the same time constant.

13. The system of claim 12, wherein the time constant is between 1.5 and 10 seconds.

14. The system of claim 9, wherein the processed longitudinal airspeed data has less higher-frequency noise than the measured longitudinal airspeed data.

15. A method, comprising:
receiving airspeed data from an airspeed sensor of a rotorcraft;
receiving acceleration data from an inertial sensor of the rotorcraft;
filtering the airspeed data to generate filtered airspeed data, the filtered airspeed data having a phase lag relative to the airspeed data;
filtering the acceleration data to generate filtered acceleration data;
multiplying the filtered acceleration data by a gain constant to generate gain-multiplied and filtered acceleration data, the gain constant based on the filtering of the acceleration data;
summing the filtered airspeed data with the gain-multiplied and filtered acceleration data to reduce the phase lag of the filtered airspeed data, the summing generating an indication of longitudinal velocity of the rotorcraft having a smaller phase lag relative to the airspeed data than the filtered airspeed data;
receiving, by a flight control computer (FCC) of the rotorcraft, the indication of longitudinal velocity; and
controlling, by the FCC of the rotorcraft, operation of the rotorcraft based on the indication of longitudinal velocity.

16. The method of claim 15, wherein receiving airspeed data comprises receiving longitudinal airspeed data.

17. The method of claim 15, wherein receiving acceleration data comprises receiving longitudinal acceleration data.

18. The method of claim 15, wherein filtering the airspeed data comprises using a digital filter.

19. The method of claim 18, wherein the digital filter is a low-pass filter.

20. The method of claim 15, wherein filtering the acceleration data reduces noise in the acceleration data.

* * * * *